(12) United States Patent
Shapiro et al.

(10) Patent No.: US 11,286,799 B2
(45) Date of Patent: *Mar. 29, 2022

(54) METHODS AND ASSEMBLIES FOR ATTACHING AIRFOILS WITHIN A FLOW PATH

(71) Applicant: General Electric Company, Schenectady, NY (US)

(72) Inventors: Jason David Shapiro, Methuen, MA (US); Donald Brett Desander, Arlington, MA (US); Edward Charles Vickers, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 16/377,398

(22) Filed: Apr. 8, 2019

(65) Prior Publication Data

US 2020/0025002 A1 Jan. 23, 2020

Related U.S. Application Data

(63) Continuation of application No. 15/440,294, filed on Feb. 23, 2017, now Pat. No. 10,253,641.

(51) Int. Cl.
*F01D 9/04* (2006.01)
*F04D 29/54* (2006.01)
(Continued)

(52) U.S. Cl.
CPC ............ *F01D 9/044* (2013.01); *F01D 9/023* (2013.01); *F01D 11/005* (2013.01); *F04D 29/54* (2013.01); *F05D 2240/12* (2013.01); *Y02T 50/60* (2013.01)

(58) Field of Classification Search
CPC .. F23R 3/002; F23R 3/007; F23R 3/60; F01D 5/3084; F01D 9/023; F01D 9/042;
(Continued)

(56) References Cited

U.S. PATENT DOCUMENTS 3,527,544 A 9/1970 Allen
3,842,595 A 10/1974 Smith et al.
(Continued)

FOREIGN PATENT DOCUMENTS

CN 104595926 A 5/2015
EP 1607582 A1 12/2005
(Continued)

OTHER PUBLICATIONS

Pratt & Whitney, PurePower Engine Family Specs Chart, http://www.pw.utc.com/PurePowerPW1000G_Engine/pdf/B-11_PurePowerEngineFamily_SpecsChart.pdf.

*Primary Examiner* — Jason H Duger
(74) *Attorney, Agent, or Firm* — Dority & Manning, P.A.

(57) ABSTRACT

Flow path assemblies for gas turbine engines are provided. For example, a flow path assembly comprises an inner wall; a unitary outer wall; and a plurality of nozzle airfoils having an inner end radially opposite an outer end. The unitary outer wall defines a plurality of outer pockets each configured for receipt of the outer end of one of the nozzle airfoils, and the inner wall includes defines a plurality of inner pockets each configured for receipt of the inner end of one of the plurality of nozzle airfoils. A portion of each inner pocket is defined by a forward inner wall segment and an aft inner wall segment. In another embodiment, a flow path assembly comprises an inner wall defining a plurality of bayonet slots that each receive a bayonet included with each of a plurality of nozzle airfoils that are integral with a unitary outer wall.

5 Claims, 11 Drawing Sheets

(51) Int. Cl.
*F01D 11/00* (2006.01)
*F01D 9/02* (2006.01)

(58) Field of Classification Search
CPC ...... F01D 9/044; F01D 25/243; F01D 25/246; F04D 29/54; F05D 2240/12; F05D 2300/6033
USPC ........................................................ 415/209.4
See application file for complete search history.

(56) References Cited

U.S. PATENT DOCUMENTS

| | | | |
|---|---|---|---|
| 4,085,581 A | 4/1978 | Caruel et al. | |
| 4,395,195 A | 7/1983 | DeCosmo et al. | |
| 4,424,667 A | 1/1984 | Fanning | |
| 4,458,479 A | 7/1984 | Reider et al. | |
| 4,686,823 A | 8/1987 | Coburn et al. | |
| 4,990,056 A | 2/1991 | McClain et al. | |
| 5,117,637 A | 6/1992 | Howell et al. | |
| 5,207,064 A | 5/1993 | Ciokajlo et al. | |
| 5,392,614 A | 2/1995 | Coffinberry | |
| 5,406,787 A | 4/1995 | Terrier | |
| 5,465,571 A | 11/1995 | Clark | |
| 5,562,408 A | 10/1996 | Proctor et al. | |
| 5,630,700 A | 5/1997 | Olsen et al. | |
| 5,842,595 A | 12/1998 | Williams | |
| 5,996,335 A | 12/1999 | Ebel | |
| 6,000,906 A * | 12/1999 | Draskovich ........... F01D 17/162 415/209.4 | |
| 6,200,092 B1 | 3/2001 | Koschier | |
| 6,207,064 B1 | 3/2001 | Gargas | |
| 6,212,870 B1 | 4/2001 | Thompson et al. | |
| 6,314,739 B1 | 11/2001 | Howell et al. | |
| 6,524,065 B2 | 2/2003 | Briesenick et al. | |
| 6,530,744 B2 | 3/2003 | Liotta et al. | |
| 6,619,030 B1 | 9/2003 | Seda et al. | |
| 6,761,534 B1 | 7/2004 | Willett | |
| 6,851,263 B2 | 2/2005 | Stumpf et al. | |
| 6,893,214 B2 | 5/2005 | Alford et al. | |
| 6,991,427 B2 | 1/2006 | Scott | |
| 7,062,920 B2 | 6/2006 | McMasters et al. | |
| 7,186,078 B2 | 3/2007 | Tanaka | |
| 7,234,306 B2 | 6/2007 | Aumont et al. | |
| 7,237,388 B2 | 7/2007 | Aumont et al. | |
| 7,249,462 B2 * | 7/2007 | Aumont ................ F01D 9/023 60/796 | |
| 7,329,087 B2 | 2/2008 | Cairo et al. | |
| 7,445,425 B2 | 11/2008 | Ferra et al. | |
| 7,452,182 B2 * | 11/2008 | Vance .................... F01D 5/14 415/135 | |
| 7,546,743 B2 | 6/2009 | Bulman et al. | |
| 7,950,234 B2 | 5/2011 | Radonovich et al. | |
| 8,141,371 B1 | 3/2012 | Habarou et al. | |
| 8,146,372 B2 | 4/2012 | Carrere et al. | |
| 8,240,980 B1 | 8/2012 | Liang | |
| 8,246,305 B2 | 8/2012 | Lecuyer et al. | |
| 8,753,073 B2 | 6/2014 | Albers et al. | |
| 8,776,525 B2 | 7/2014 | Oechsle | |
| 8,887,487 B2 | 11/2014 | Kupratis et al. | |
| 8,905,711 B2 | 12/2014 | Suciu et al. | |
| 9,039,364 B2 | 5/2015 | Alvanos et al. | |
| 9,169,736 B2 | 10/2015 | Hayford et al. | |
| 9,255,487 B2 | 2/2016 | Mayer et al. | |
| 9,308,708 B2 | 4/2016 | Kleinow | |
| 9,335,051 B2 | 5/2016 | Jarmon et al. | |
| 9,427,834 B2 | 8/2016 | Fremont et al. | |
| 9,447,973 B2 | 9/2016 | Clemen | |
| 10,107,119 B2 | 10/2018 | Walston | |
| 10,174,619 B2 | 1/2019 | Uskert et al. | |
| 10,247,019 B2 | 4/2019 | Shapiro et al. | |
| 10,253,641 B2 | 4/2019 | Shapiro et al. | |
| 10,317,085 B2 | 6/2019 | Hannwacker et al. | |
| 10,371,383 B2 | 8/2019 | Reynolds et al. | |
| 10,378,373 B2 | 8/2019 | Reynolds et al. | |
| 10,378,770 B2 | 8/2019 | Reynolds et al. | |
| 10,385,709 B2 | 8/2019 | Reynolds et al. | |
| 10,385,776 B2 | 8/2019 | Reynolds et al. | |
| 10,393,381 B2 | 8/2019 | Noe et al. | |
| 10,450,897 B2 | 10/2019 | Gallier et al. | |
| 2003/0002979 A1 | 1/2003 | Koschier | |
| 2003/0061815 A1 | 4/2003 | Young et al. | |
| 2004/0118122 A1 | 6/2004 | Mitchell et al. | |
| 2008/0066468 A1 | 3/2008 | Faulder et al. | |
| 2010/0139847 A1 | 6/2010 | Law et al. | |
| 2010/0326078 A1 | 12/2010 | Pieussergues et al. | |
| 2011/0225070 A1 | 9/2011 | Johnson et al. | |
| 2011/0271144 A1 | 11/2011 | James et al. | |
| 2011/0271684 A1 | 11/2011 | Corsmeier et al. | |
| 2013/0000324 A1 | 1/2013 | Alvanos et al. | |
| 2013/0209261 A1 | 8/2013 | Renard et al. | |
| 2014/0271144 A1 | 9/2014 | Landwehr et al. | |
| 2014/0363276 A1 | 12/2014 | Vetters et al. | |
| 2015/0204447 A1 | 7/2015 | Kloepfer | |
| 2015/0292402 A1 | 10/2015 | Razak | |
| 2015/0308277 A1 | 10/2015 | Verhelst | |
| 2015/0377061 A1 | 12/2015 | Boeck | |
| 2016/0001873 A1 | 1/2016 | Schwarz | |
| 2016/0032778 A1 | 2/2016 | Sanchez | |
| 2016/0084501 A1 | 3/2016 | Lunel et al. | |
| 2016/0102574 A1 | 4/2016 | Peters | |
| 2016/0123187 A1 | 5/2016 | Leslie et al. | |
| 2016/0131084 A1 | 5/2016 | Kupratis et al. | |
| 2016/0186583 A1 | 6/2016 | Alvanos | |
| 2016/0201515 A1 | 7/2016 | Chang | |
| 2016/0208700 A1 | 7/2016 | Minnear et al. | |
| 2016/0245105 A1 | 8/2016 | Farah et al. | |
| 2016/0265430 A1 | 9/2016 | Schwarz | |
| 2017/0009989 A1 | 1/2017 | Clemen | |
| 2017/0044915 A1 | 2/2017 | Mugglestone | |
| 2017/0058778 A1 | 3/2017 | Bloom et al. | |
| 2017/0248320 A1 | 8/2017 | Hannwacker et al. | |
| 2017/0370583 A1 | 12/2017 | Marusko et al. | |
| 2018/0016924 A1 | 1/2018 | Gallier et al. | |
| 2018/0216575 A1 | 8/2018 | Miller et al. | |
| 2018/0216822 A1 | 8/2018 | Noe et al. | |
| 2018/0216823 A1 | 8/2018 | Reynolds et al. | |
| 2018/0216824 A1 | 8/2018 | Reynolds et al. | |
| 2018/0238181 A1 | 8/2018 | Reynolds et al. | |
| 2018/0355804 A1 | 12/2018 | Miller et al. | |

FOREIGN PATENT DOCUMENTS

| | | |
|---|---|---|
| EP | 2466074 | 6/2012 |
| JP | 2017170807 A | 9/2017 |

* cited by examiner

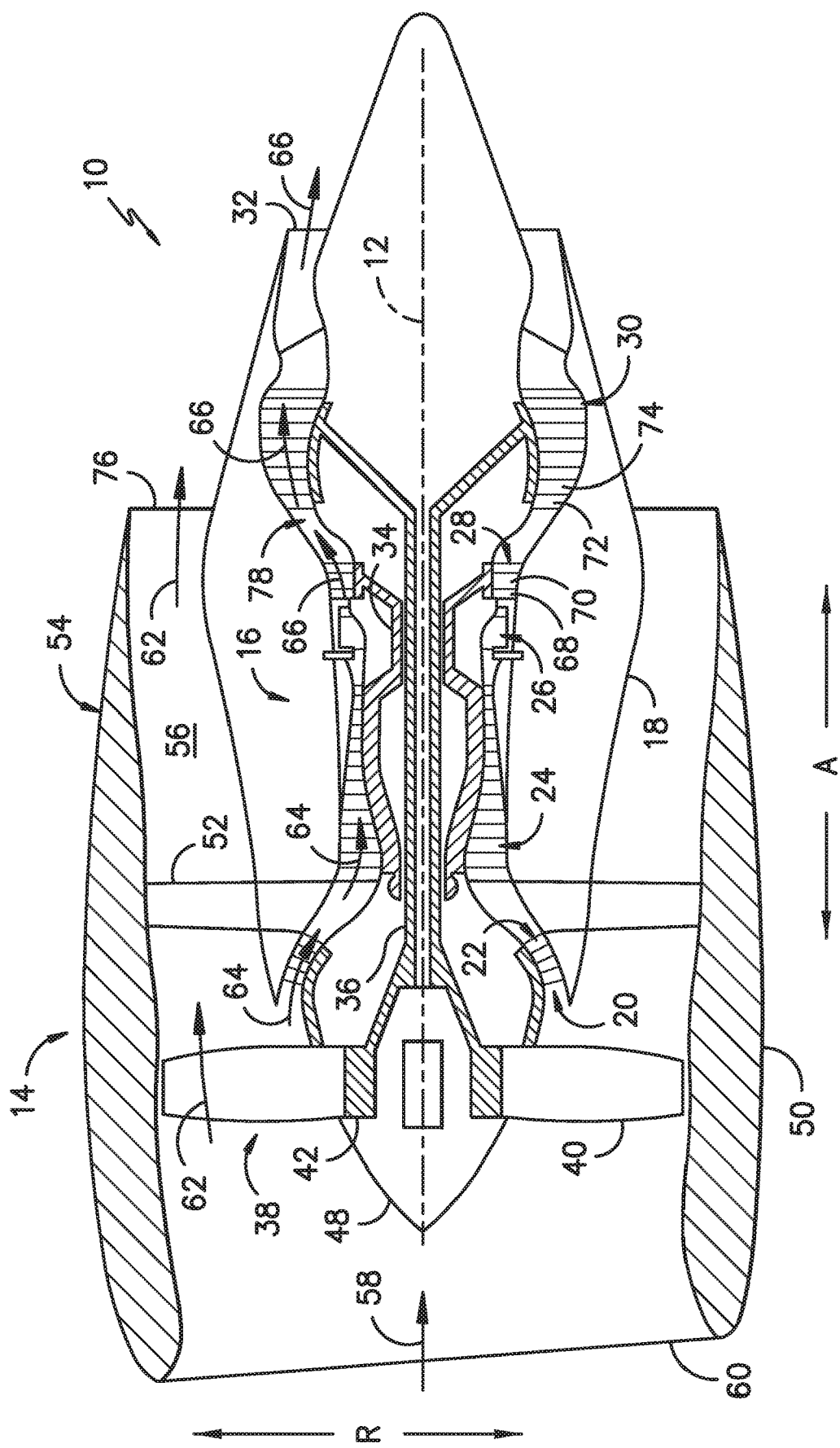
FIG. -1-

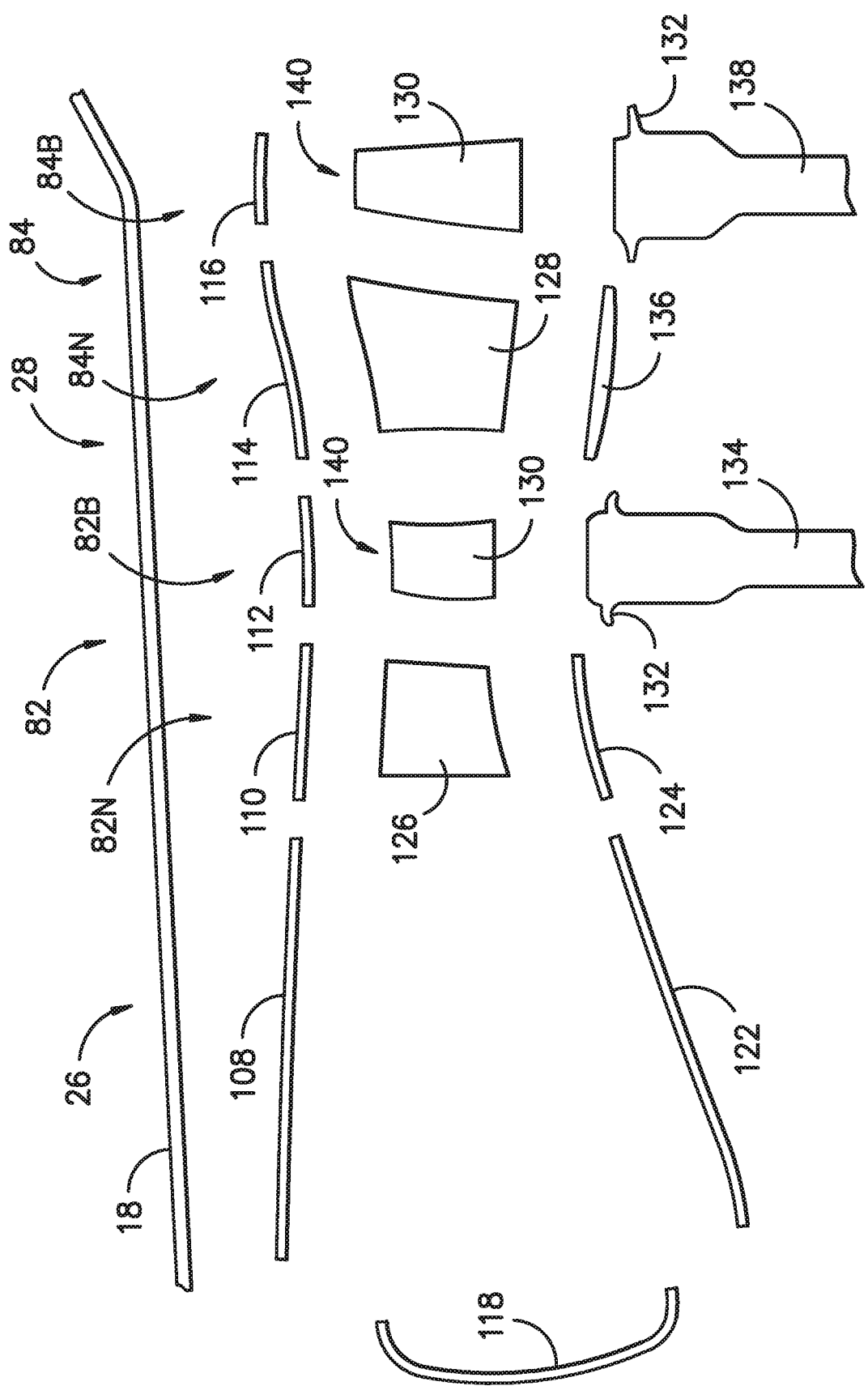
FIG. -2-

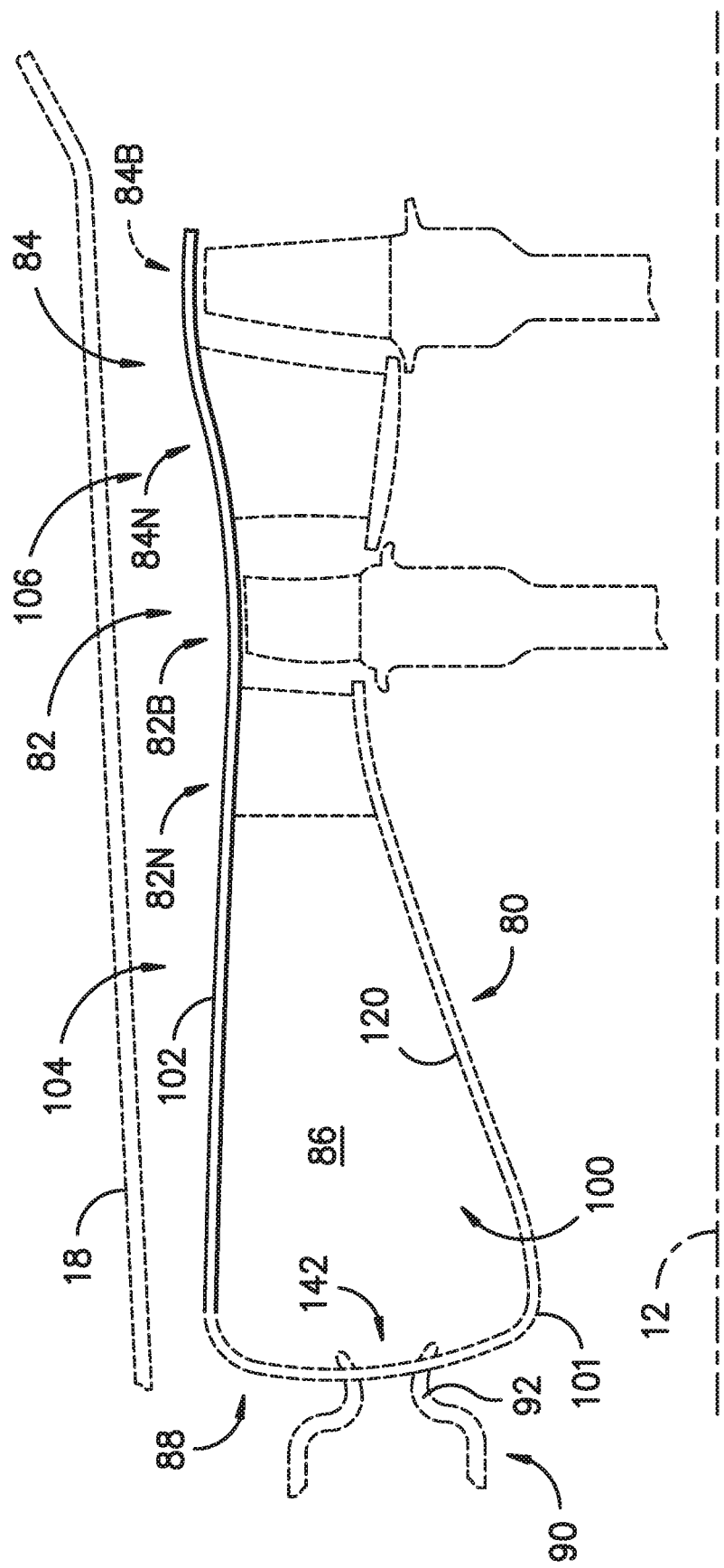
FIG. -3A-

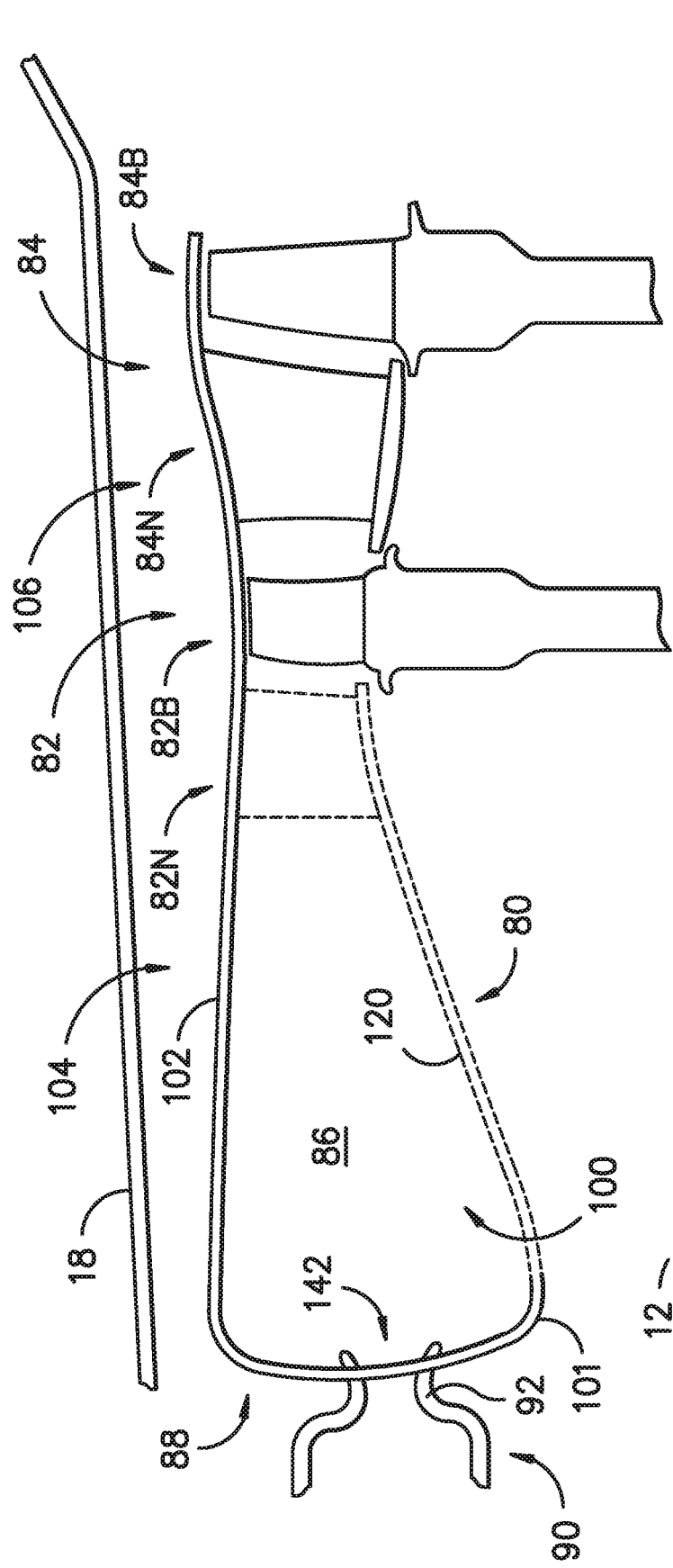
FIG. -3B-

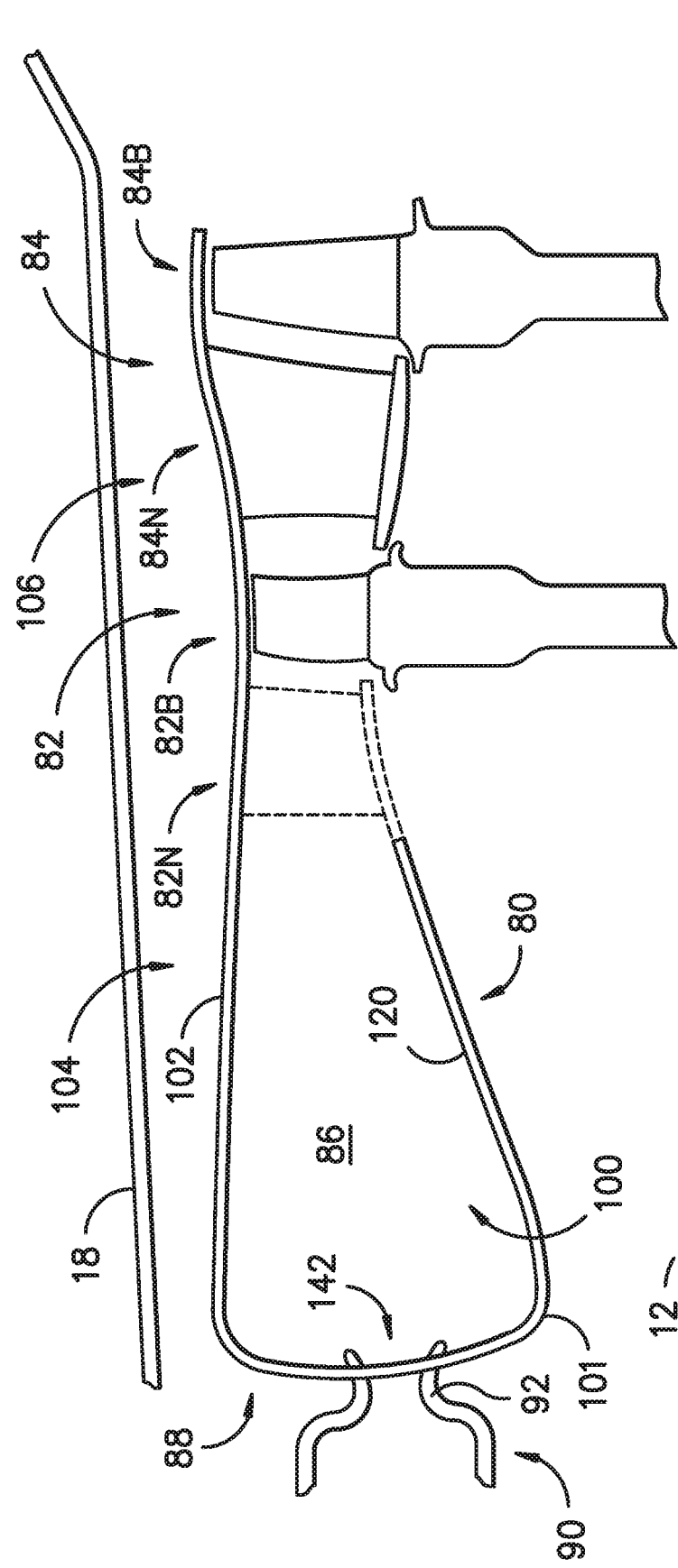
FIG. -3C-

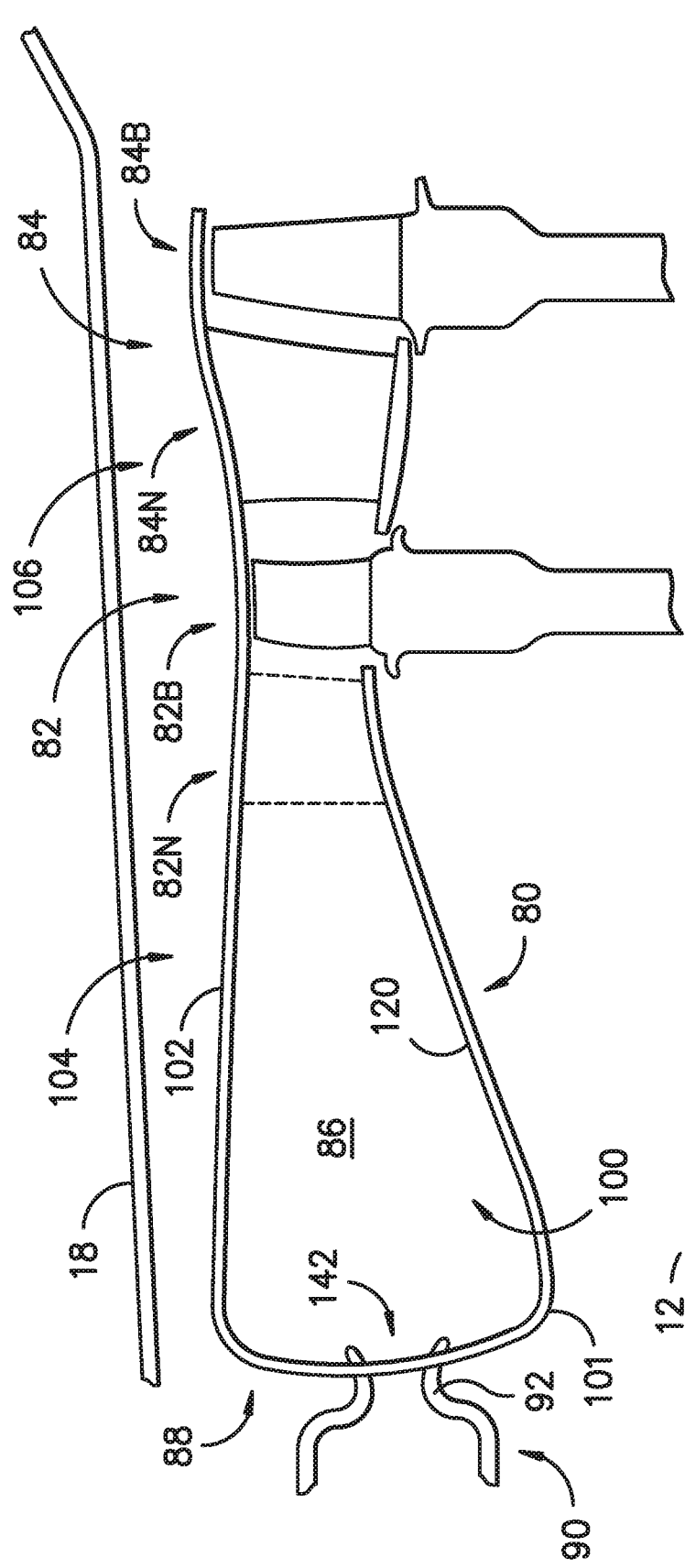
FIG. -3D-

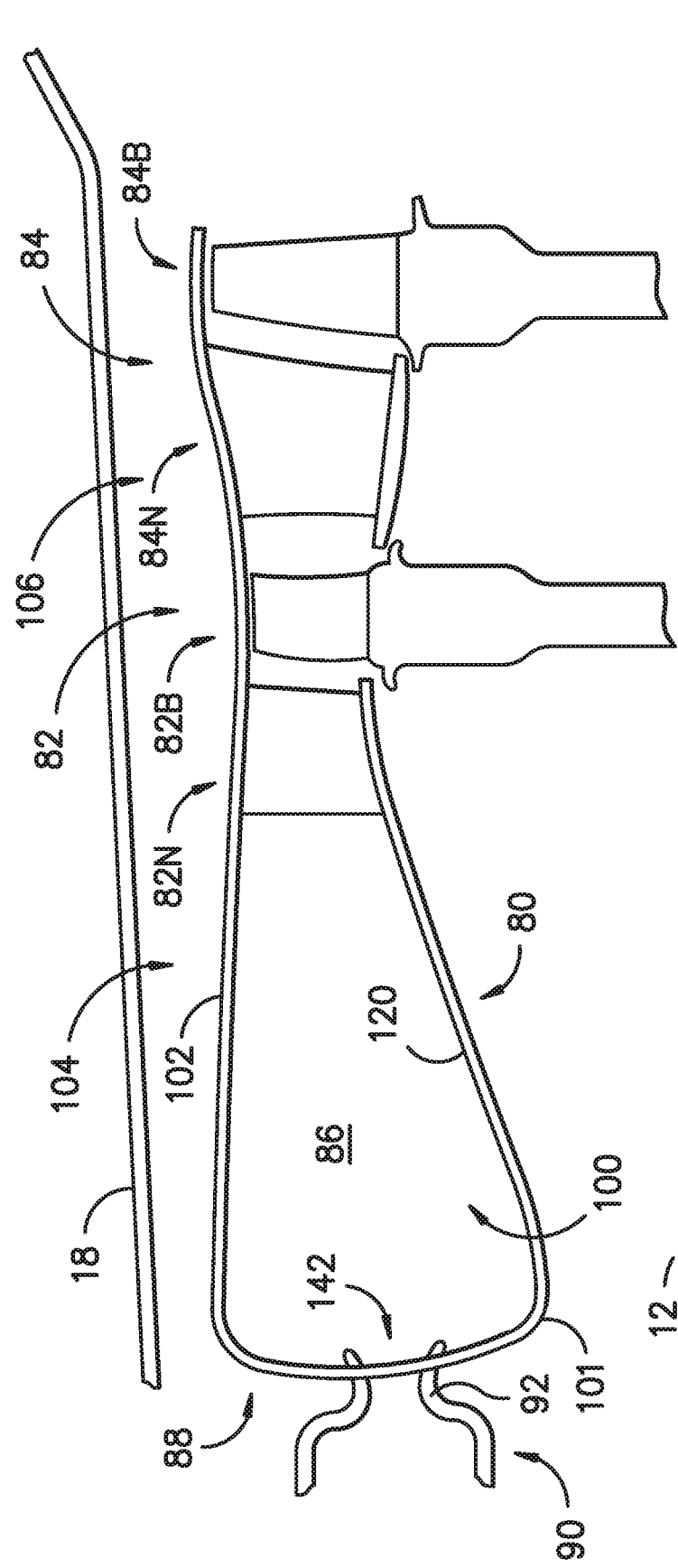
FIG. -3E-

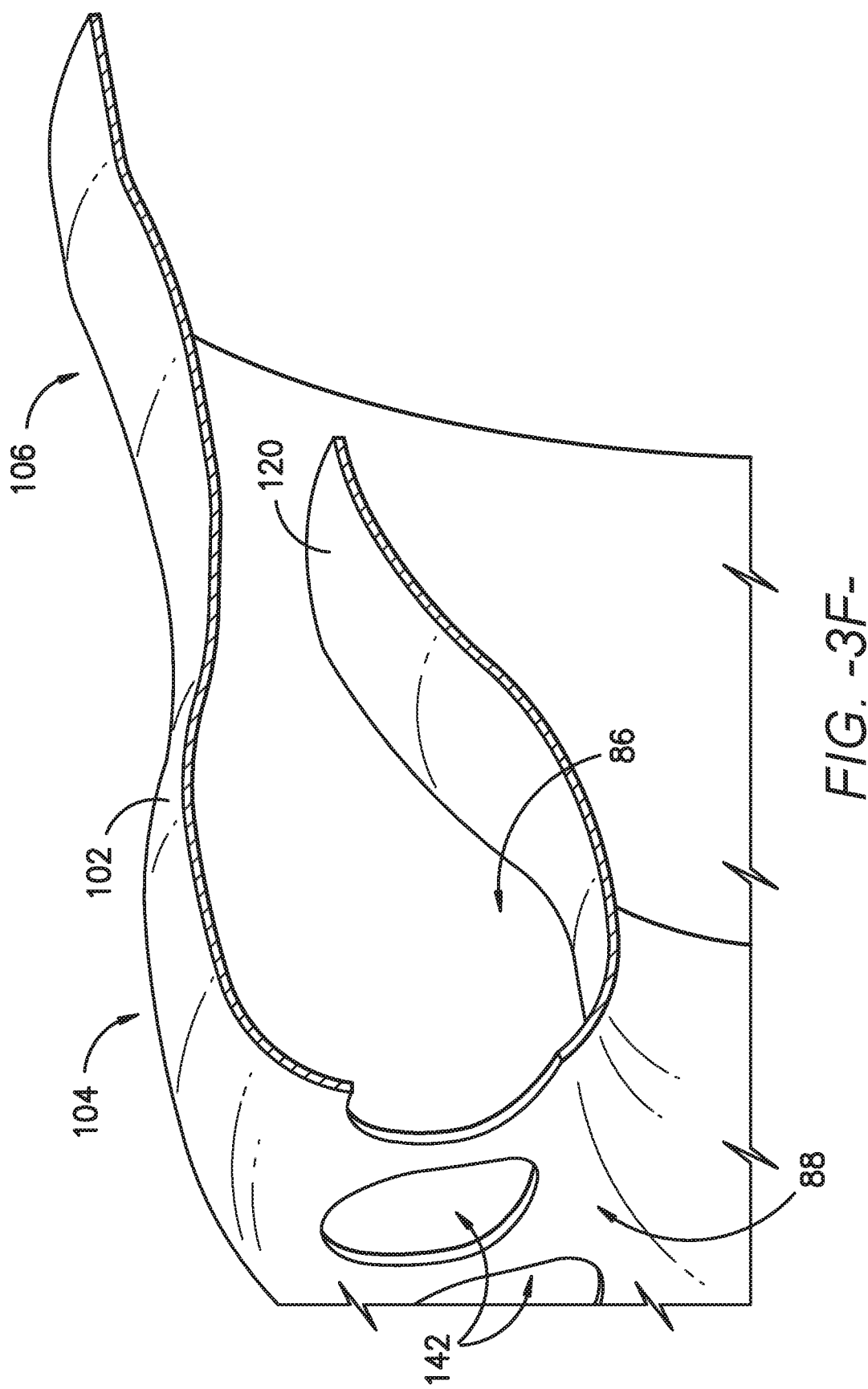
FIG. -3F-

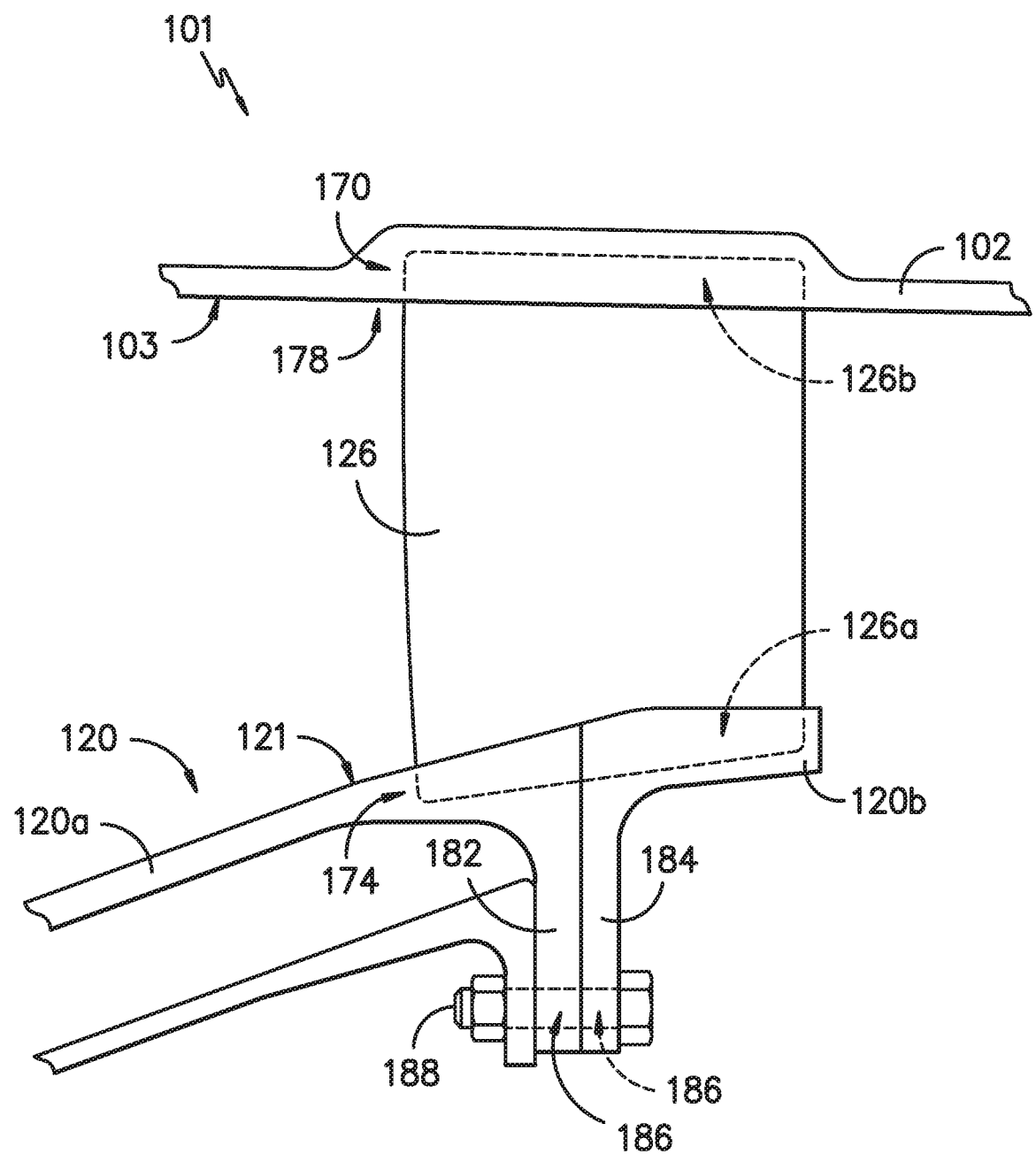
FIG. -4-

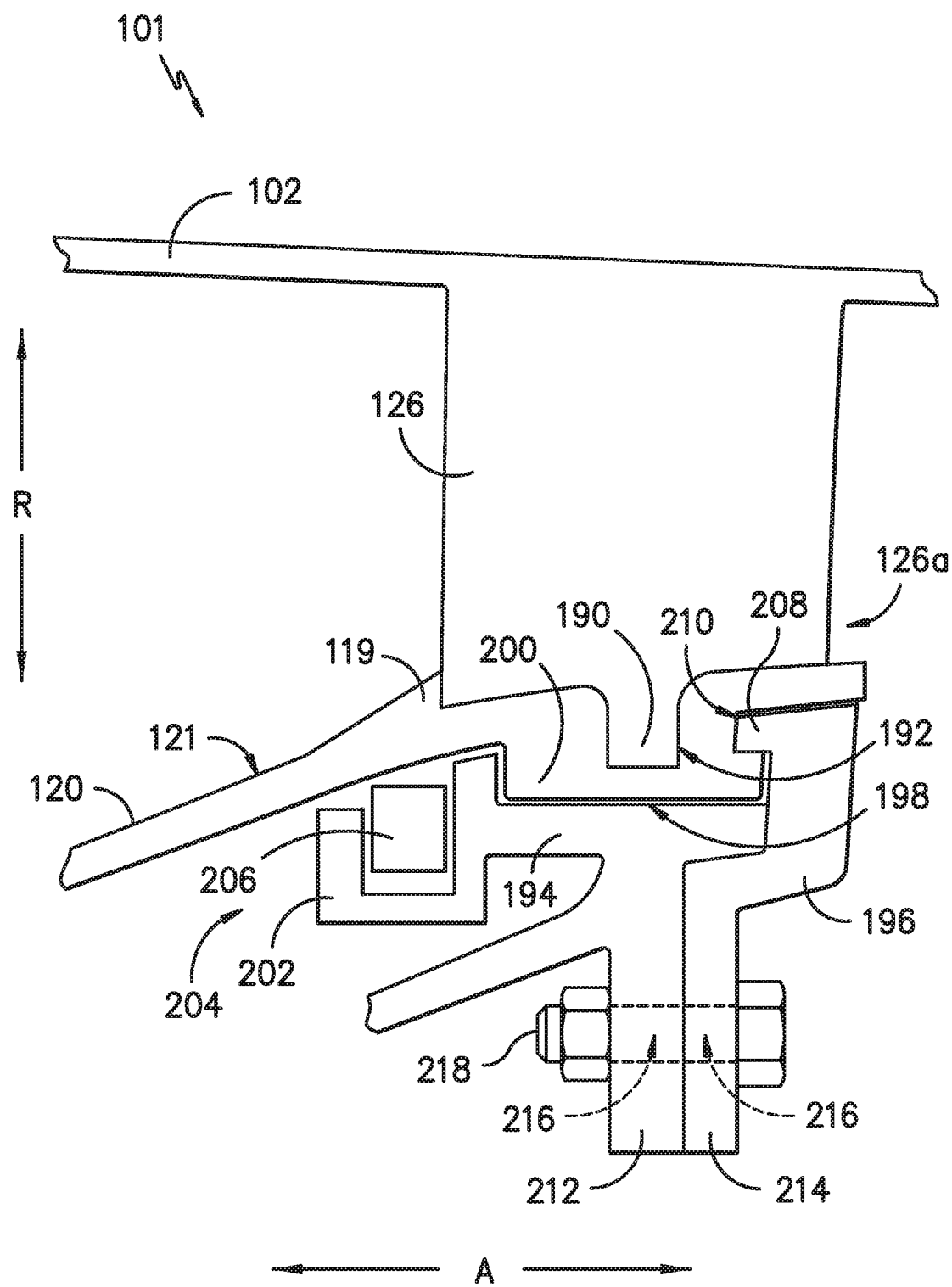
FIG. -5-

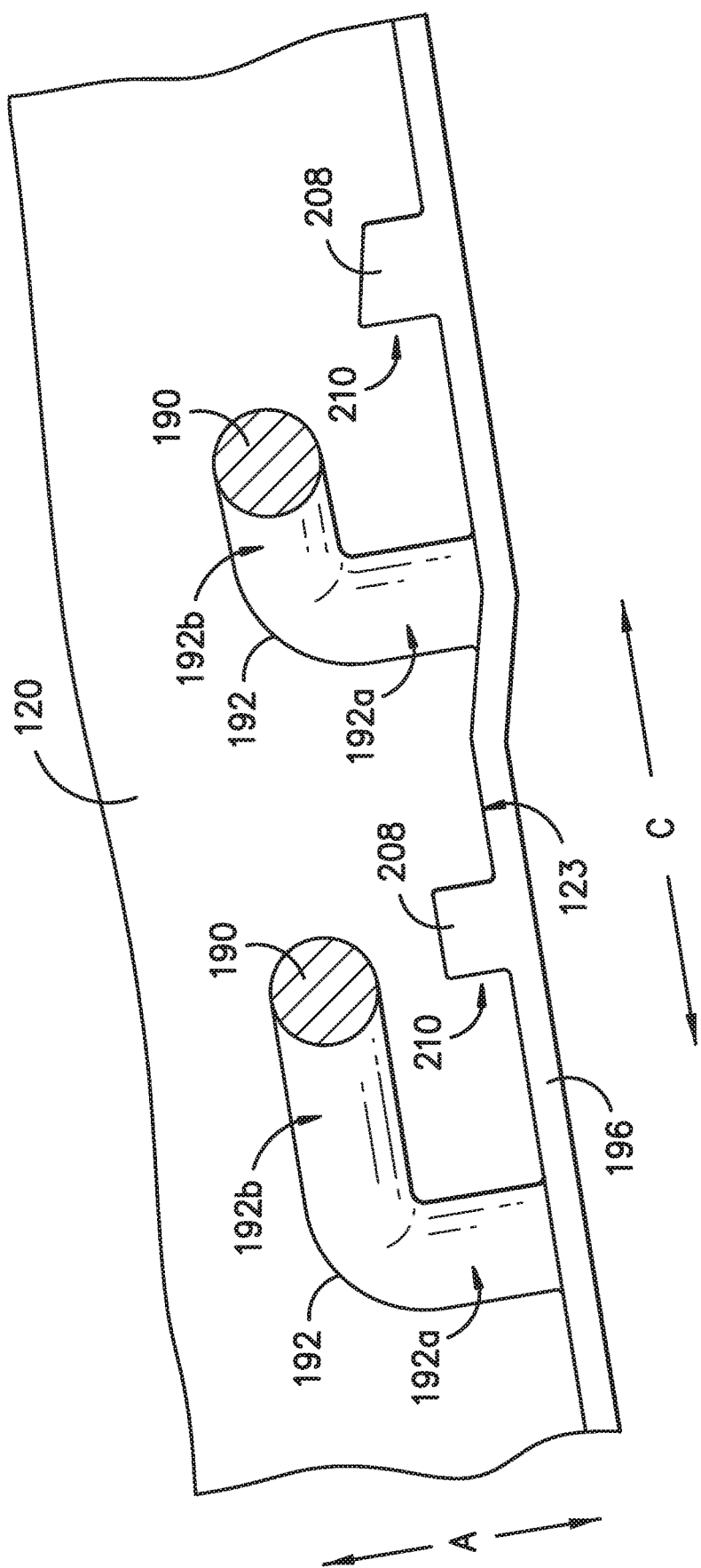
FIG. -6-

METHODS AND ASSEMBLIES FOR ATTACHING AIRFOILS WITHIN A FLOW PATH

CROSS-REFERENCE TO RELATED APPLICATIONS

This application is a continuation of and claims priority to U.S. application Ser. No. 15/440,294 (issued as U.S. Pat. No. 10,253,641), filed Feb. 23, 2017, the contents of which are incorporated herein by reference.

FIELD

The present subject matter relates generally to gas turbine engines. More particularly, the present subject matter relates to outer and inner flow path boundary configurations for receipt of stator airfoils, as well as methods for assembling stator airfoils to a gas turbine flow path assembly.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More particularly, the combustion section includes a combustor having a combustion chamber defined by a combustor liner. Downstream of the combustor, the turbine section includes one or more stages, for example, each stage may contain a plurality of stationary nozzle airfoils as well as a plurality of blade airfoils attached to a rotor that is driven by the flow of combustion gases against the blade airfoils. The turbine section may have other configurations as well. In any event, a flow path is defined by an inner boundary and an outer boundary, which both extend from the combustor through the stages of the turbine section.

Typically, the inner and outer boundaries defining the flow path comprise separate components. For example, an outer liner of the combustor, a separate outer band of a nozzle portion of a turbine stage, and a separate shroud of a blade portion of the turbine stage usually define at least a portion of the outer boundary of the flow path. However, utilizing separate components to form each of the outer boundary and the inner boundary requires a great number of parts, e.g., one or more seals may be required at each interface between the separate components to minimize leakage of fluid from the flow path, which can increase the complexity and weight of the gas turbine engine without eliminating leakage points between the separate components. Therefore, flow path assemblies may be utilized that have a unitary construction, e.g., a unitary outer boundary structure, where two or more components of the outer boundary are integrated into a single piece, and/or a unitary inner boundary structure, where two or more components of the inner boundary are integrated into a single piece.

A unitary construction of the flow path assembly may be furthered by various ways of assembling the turbine nozzle airfoils, which also may be referred to as stator vanes, with the outer boundary structure and the inner boundary structure. For example, the outer boundary structure and/or the inner boundary structure each may be constructed as a unitary structure or together may be constructed as a single unitary structure, with the nozzle airfoils inserted and secured during subsequent assembly. As another example, the nozzle airfoils may be integrally formed with one of the outer boundary structure or the inner boundary structure and attached to the other boundary structure during subsequent assembly. Separating the nozzle airfoils from the outer and/or inner boundary structures of the flow path assembly may simplify manufacturing, as well as reduce internal stresses compared to flow path assemblies comprising nozzle airfoils that are integral with both the outer and inner boundary structures.

Accordingly, improved flow path assemblies would be desirable. For example, a flow path assembly utilizing a unitary outer wall to define its outer boundary and having a plurality of nozzle airfoils received in pockets in the outer and inner boundaries would be beneficial. As another example, a flow path assembly utilizing a unitary inner wall to define its outer boundary and having a plurality of nozzle airfoils received in pockets in the outer and inner boundaries would be advantageous. Additionally, an inner wall that defines a plurality of slots for receipt of bayonets or projections from a plurality of nozzle airfoils to secure the nozzle airfoils to the inner wall would be useful.

BRIEF DESCRIPTION

Aspects and advantages of the invention will be set forth in part in the following description, or may be obvious from the description, or may be learned through practice of the invention.

In one exemplary embodiment of the present disclosure, a flow path assembly for a gas turbine engine is provided. The flow path assembly comprises an inner wall; a unitary outer wall; and a plurality of nozzle airfoils, each nozzle airfoil having an inner end radially opposite an outer end. The unitary outer wall includes a combustor portion extending through a combustion section of the gas turbine engine and a turbine portion extending through at least a first turbine stage of a turbine section of the gas turbine engine. The combustor portion and the turbine portion are integrally formed as a single unitary structure. Further, the inner wall and the unitary outer wall define a combustor of the combustion section. Also, the unitary outer wall defines a plurality of outer pockets, each outer pocket configured for receipt of the outer end of one of the plurality of nozzle airfoils. The inner wall includes a forward segment and an aft segment and defines a plurality of inner pockets such that a portion of each inner pocket is defined by the forward segment and a remaining portion of each inner pocket is defined by the aft segment. Each inner pocket is configured for receipt of the inner end of one of the plurality of nozzle airfoils such that a nozzle airfoil extends from each inner pocket to a respective outer pocket.

In another exemplary embodiment of the present disclosure, a flow path assembly for a gas turbine engine is provided. The flow path assembly comprises an inner wall; an outer wall; and a plurality of nozzle airfoils, each nozzle airfoil having an inner end radially opposite an outer end. The inner wall and the unitary outer wall define a combustor of the combustion section. Moreover, the inner wall defines a plurality of inner pockets, each inner pocket configured for receipt of the inner end of one of the plurality of nozzle airfoils. The outer wall includes a forward segment and an aft segment and defines a plurality of outer pockets such that a portion of each outer pocket is defined by the forward segment and a remaining portion of each outer pocket is defined by the aft segment. Each outer pocket is configured for receipt of the outer end of one of the plurality of nozzle airfoils such that a nozzle airfoil extends from each inner pocket to a respective outer pocket.

In a further exemplary embodiment of the present disclosure, a flow path assembly for a gas turbine engine is provided. The flow path assembly comprises an inner wall defining a plurality of bayonet slots and a plurality of recesses along an aft surface of the inner wall. The flow path assembly also comprises a unitary outer wall including a combustor portion extending through a combustion section of the gas turbine engine and a turbine portion extending through at least a first turbine stage of a turbine section of the gas turbine engine. The turbine portion includes a plurality of nozzle airfoils, and the combustor portion and the turbine portion are integrally formed as a single unitary structure such that the plurality of nozzle airfoils is integral with the outer wall. The flow path assembly further comprises a first support member positioned radially inward of the inner wall to support the inner wall and a second support member positioned axially aft of the first support member. The second support member includes a plurality of tabs. An inner end of each nozzle airfoil is positioned against the inner wall, and each tab is received in a recess of the plurality of recesses defined in the inner wall such that the second support member fits against the aft surface of the inner wall to cover the plurality of bayonet slots.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic exploded cross-section view of a combustion section and a high pressure turbine section of the gas turbine engine of FIG. 1 according to an exemplary embodiment of the present subject matter.

FIG. 3A provides a schematic cross-section view of the combustion section and high pressure turbine section of FIG. 2 according to an exemplary embodiment of the present subject matter.

FIGS. 3B, 3C, 3D, and 3E provide schematic cross-section views of the combustion section and high pressure turbine section of FIG. 2 according to other exemplary embodiments of the present subject matter.

FIG. 3F provides a partial perspective view of a portion of an integral outer boundary structure and inner boundary structure of the combustion section and high pressure turbine section of FIG. 2 according to an exemplary embodiment of the present subject matter.

FIG. 4 provides a schematic cross-section view of a portion of a flow path assembly according to an exemplary embodiment of the present subject matter.

FIG. 5 provides a schematic cross-section view of a portion of a flow path assembly according to another exemplary embodiment of the present subject matter.

FIG. 6 provides a schematic cross-section view of the flow path assembly of FIG. 5, where the view is radially downward.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. Of course, in some embodiments, other high temperature materials and/or other composite materials may be used to form one or more components of engine 10.

FIG. 2 provides an exploded view of a schematic cross-section of the combustion section 26 and the HP turbine 28 of the turbine section of the turbofan engine 10 according to an exemplary embodiment of the present subject matter. FIG. 3A provides an unexploded schematic cross-sectional view of the combustion section 26 and the HP turbine 28 of FIG. 2 that focuses on an outer boundary of a flow path through the combustion section 26 and HP turbine 28. The depicted combustion section 26 includes a generally annular combustor 80, and downstream of the combustion section 26, the HP turbine 28 includes a plurality of turbine stages. More particularly, for the depicted embodiment, HP turbine 28 includes a first turbine stage 82 and a second turbine stage 84. In other embodiments, the HP turbine 28 may comprise a different number of turbine stages; for example, the HP turbine 28 may include one turbine stage or more than two turbine stages. The first turbine stage 82 is positioned immediately downstream of the combustion section 26, and the second turbine stage 84 is positioned immediately downstream of the first turbine stage 82. Further, each turbine stage 82, 84 comprises a nozzle portion and a blade portion; the first turbine stage 82 includes nozzle portion 82N and blade portion 82B, and the second turbine stage 84 includes nozzle portion 84N and blade portion 84B. The nozzle portion 82N of the first turbine stage 82 is located immediately downstream of the combustion section 26, such that the nozzle portion 82N of the first turbine stage 82 also may be referred to as a combustor discharge nozzle. Moreover, combustor 80 defines a generally annular combustion chamber 86 such that the combustor 80 may be described as a generally annular combustor.

Additionally, as described in greater detail below, a flow path 100 through the combustion section 26 and the HP turbine 28 is defined by an outer boundary and an inner boundary of a flow path assembly 101. The outer and inner boundaries form a flow path for the combustion gases 66 through the combustion section 26 and HP turbine 28; thus, the flow path 100 may comprise at least a portion of the hot gas path 78 described above. Further, in other embodiments, the flow path 100 also may extend through LP turbine 30 and jet exhaust 32; in still other embodiments, the flow path 100 also may extend forward upstream of the combustion section 26, e.g., into HP compressor 24. As such, it will be appreciated that the discussion herein of the present subject matter with respect to combustion section 26 and HP turbine 28 is by way of example only and also may apply to different configurations of gas turbine engines and flow paths 100.

As shown in the exploded view of FIG. 2, the outer and inner boundaries may be defined by an outer wall 102 and an inner wall 120, respectively, which may include several portions of the combustion section 26 and HP turbine 28. For instance, the combustor 80 includes an outer liner 108 defining an outer boundary of the flow path through the combustor 80. Each nozzle portion 82N, 84N comprises an outer band defining an outer boundary of a flow path through the nozzle portion of each turbine stage, and each blade portion 82B, 84B comprises a shroud defining an outer boundary of a flow path through the blade portion of each turbine stage. More particularly, as shown in FIG. 2, the first turbine stage nozzle portion 82N comprises outer band 110, first turbine stage blade portion 82B comprises shroud 112, second turbine stage nozzle portion 84N comprises outer band 114, and second turbine stage blade portion 84B comprises shroud 116. These portions of the combustion section 26 and HP turbine 28 may comprise at least a portion of the outer wall 102, as described in greater detail below.

Further, as illustrated in FIG. 2, the combustor 80 includes an inner liner 122 defining an inner boundary of the flow path through the combustor 80. Each nozzle portion 82N, 84N comprises an inner band defining an inner boundary of the flow path through the nozzle portion of each turbine stage, and each blade portion 82B, 84B comprises one or more blade platforms that define an inner boundary of the flow path through the blade portion of each turbine stage. More particularly, as shown in FIG. 2, the first turbine stage nozzle portion 82N comprises inner band 124, first turbine stage blade portion 82B comprises blade platforms 132, second turbine stage nozzle portion 84N comprises inner band 136, and second turbine stage blade portion 84B comprises blade platforms 132. These portions of the combustion section 26 and HP turbine 28 may comprise at least a portion of the inner wall 122, as described in greater detail below.

Moreover, in the depicted embodiment, a combustor dome 118 extends radially across a forward end 88 of the combustor 80. The combustor dome 118 may be a part of outer wall 102, may be a part of inner wall 120, may be a part of both outer wall 102 and inner wall 120 (e.g., a portion of the combustor dome 118 may be defined by the outer wall 102 and the remainder may be defined by the inner wall 120), or may be a separate component from outer wall 102 and inner wall 120. Additionally, a plurality of nozzle airfoils is positioned in each of the nozzle portions 82N, 84N. Each nozzle airfoil 126 within the first turbine stage nozzle portion 82N extends radially from the outer band 110 to the inner band 124, and the nozzle airfoils 126 are spaced circumferentially about the longitudinal centerline 12. Each nozzle airfoil 128 within the second turbine stage nozzle portion 84N extends radially from the outer band 114 to the inner band 136, and the nozzle airfoils 128 are spaced circumferentially about the longitudinal centerline 12. Further, a plurality of blade airfoils 130 are positioned in each of the blade portions 82B, 84B. Each blade airfoil 130 within the first turbine stage blade portion 82B is attached to blade platform 132, which in turn is attached to a first stage rotor 134. The blade airfoils 130 attached to the first stage rotor 134 are spaced circumferentially about the longitudinal centerline 12. Similarly, each blade airfoil 130 within the second turbine stage blade portion 84B is attached to a blade platform 132, which in turn is attached to a second stage rotor 138. The blade airfoils 130 attached to the second stage rotor 138 are spaced circumferentially about the longitudinal centerline 12. Each blade airfoils 130 extends radially outward toward the outer wall 102, i.e., the outer boundary of the flow path 100, and a clearance gap is defined between a tip 140 of each blade airfoil 130 and the outer wall 102 such that each turbine rotor 134, 138 is free to rotate within its respective turbine stage. Although not depicted, each turbine rotor 134, 138 of the HP turbine 28 is connected to the HP shaft 34 (FIG. 1). In such manner, rotor blade airfoils 130 may extract kinetic energy from the flow of combustion gases through the flow path 100 defined by the HP turbine 28 as rotational energy applied to the HP shaft 34.

Accordingly, flow path 100 through the combustion section 26 and the HP turbine 28 is defined by a flow path assembly 101 having an inner boundary and an outer boundary, and the inner and outer boundaries define the flow path for the combustion gases 66 through the combustion section 26 and HP turbine 28. Portions of the outer boundary of the flow path assembly 101 may be integrated or unified into a single piece outer wall 102 that defines the radially outer boundary of the gas flow path 100. For instance, the outer wall 102 may include a combustor portion 104 extending through a combustion section, such as combustion section 26, and a turbine portion 106 extending through at least a first turbine stage of a turbine section, such as first turbine stage 82 of HP turbine 28. The combustor portion 104 and turbine portion 106 are integrally formed such that the combustor portion and the turbine portion are a single unitary structure, i.e., a unitary outer wall 102.

In the exemplary embodiment depicted in FIG. 3A, the outer wall 102 includes a combustor portion 104 extending through the combustion section 26 and a turbine portion 106 extending through at least the first turbine stage 82 and the second turbine stage 84 of the turbine section. In other embodiments, the turbine portion 106 may extend through fewer stages (e.g., through one turbine stage as just described) or through more stages (e.g., through one or more stages of the LP turbine 30 positioned downstream of HP turbine 28). The combustor portion 104 and the turbine portion 106 are integrally formed such that the combustor portion 104 and the turbine portion 106 are a single unitary structure, which is referred to herein as unitary outer wall 102.

The term "unitary" as used herein denotes that the associated component, such as the outer wall 102, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

As shown in FIG. 3A, the combustor portion 104 of the unitary structure forming outer wall 102 includes the outer liner 108 of the combustor 80. The turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B. As stated, these outer boundary components are integrated into a single piece to form the unitary structure that is outer wall 102. Thus, in the exemplary embodiment of FIG. 2, outer liner 108, outer band 110, shroud 112, outer band 114, and shroud 116 are integrally formed, i.e., constructed as a single unit or piece to form the integrated or unitary outer wall 102.

In some embodiments, other portions of the flow path assembly 101 may be integrated into the unitary structure of outer wall 102, and in still other embodiments, at least a portion of the outer boundary and the inner boundary are made as a single, unitary component such that the flow path assembly 101 may be referred to as an integrated flow path assembly. For example, referring to FIG. 3B, the combustor portion 104 of unitary outer wall 102 also may include the combustor dome 118 that extends across the forward end 88 of combustor 80. As such, in the exemplary embodiment of FIG. 3B, the outer liner 108, outer band 110, shroud 112, outer band 114, shroud 116, and combustor dome 118 are constructed as a single unit or piece to form the integrated or unitary outer wall 102. That is, the outer liner 108, outer bands 110, 114, shrouds 112, 116, and combustor dome 118 are integrally formed such that the outer liner 108, outer bands 110, 114, shrouds 112, 116, and combustor dome 118 are a single unitary structure.

As another example, referring to FIG. 3C, at least a portion of the inner wall 120 defining the inner boundary of the flow path 100 may be integrated with the outer wall 102 to form an integrated flow path assembly 101. In the exemplary embodiment of FIG. 3C, the combustor portion 104 further comprises the inner liner 122, such that the inner liner 122 is integrated with the unitary structure of the outer wall 102 shown in FIG. 3B. Thus, the outer liner 108, outer band 110, shroud 112, outer band 114, shroud 116, combustor dome 118, and inner liner 122 are integrally formed such that the outer liner 108, outer bands 110, 114, shrouds 112, 116, combustor dome 118, and inner liner 122 are a single unitary structure. In the exemplary embodiment of FIG. 3D, the turbine portion 106 further includes the inner band 124 of the first turbine stage nozzle portion 82N, such that the inner band 124 is integrated with the unitary structure of the flow path assembly 101 shown in FIG. 3C. Accordingly, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. In the exemplary embodiment of FIG. 3E, the turbine portion 106 further includes the plurality of nozzle airfoils 126, such that each nozzle airfoil 126 of the plurality of nozzle airfoils 126 of the first turbine stage nozzle portion 82N is integrated with the unitary structure of the flow path assembly 101 shown in FIG. 3D. Therefore, the outer liner 108, outer band 110, shroud 112, outer band 114, shroud 116, combustor dome 118, inner liner 122, inner band 124, and nozzle airfoils 126 are integrally formed such that the outer liner 108, outer bands 110, 114, shrouds 112, 116, combustor dome 118, inner liner 122, inner band 124, and nozzle airfoils 126 are a single unitary structure.

Of course, the nozzle airfoils 126 of the first turbine stage nozzle portion 82N may be integrated with the outer wall 102 without being integrated with the inner wall 120. For example, the plurality of nozzle airfoils 126 may be formed as a single unit or piece with the outer liner 108, outer band 110, shroud 112, outer band 114, shroud 116 such that the outer liner 108, outer bands 110, 114, shrouds 112, 116, and nozzle airfoils 126 are a single unitary structure, i.e., a unitary outer wall 102. In other embodiments, the unitary outer wall 102 also may include the combustor dome 118, such that the outer liner 108, outer band 110, shroud 112, outer band 114, shroud 116, combustor dome 118, and nozzle airfoils 126 are integrally formed or constructed as a single unit or piece. In still other embodiments, the inner liner 122 also may be included, such that the outer liner 108, outer band 110, shroud 112, outer band 114, shroud 116, combustor dome 118, inner liner 122, and nozzle airfoils 126 are integrally formed as a single unitary structure, i.e., a unitary outer wall 102.

In yet other embodiments, the combustor dome 118 may not be integrated with either the outer wall 102 or the inner wall 120 in whole or in part. That is, the combustor dome 118 is a separate component from both the outer wall 102 and the inner wall 120. As such, the flow path 100 may be discontinuous between the combustor dome 118 and outer wall 102, as well as between combustor dome 118 and inner wall 120. Further, in such embodiments, the combustor dome 118 is configured to move axially with respect to the inner wall 120 and the outer wall 102 but may be attached to, and accordingly supported by, one or more fuel nozzle assemblies 90. More particularly, an axial slip joint may be formed between the combustor dome 118 and each of the outer wall 102 and the inner wall 120 such that the combustor dome 118 may move or float axially with respect to the inner wall 120 and outer wall 102. Allowing the combustor dome 118 to float relative to the outer wall 102 and inner wall 120 can help control the position of the fuel nozzle assembly 90 with respect to the combustor dome 118 and combustor 80. For example, the combustor dome 118, outer wall 102, and inner wall 120 may be made of a different material or materials than the fuel nozzle assembly 90. As described in greater detail below, in an exemplary embodiment, the combustor dome 118, outer wall 102, and inner wall 120 are made from a ceramic matrix composite (CMC) material, and the fuel nozzle assembly 90 may be made from a metallic material, e.g., a metal alloy or the like. In such embodiment, the CMC material thermally grows or expands at a different rate than the metallic material. Thus, allowing the combustor dome 118 to move axially with respect to outer and inner walls 102, 120 may allow for tighter control of the immersion of swirler 92 of fuel nozzle assembly 90 within combustor dome 118, as well as combustor 80, than if the combustor dome 118 was attached to the outer and inner walls 102, 120. Tighter control of the position of fuel nozzle assembly 90 and its components with respect to combustor 80 can reduce variation in operability and performance of engine 10.

Additionally, in embodiments in which the combustor dome 118 is separate from the outer and inner walls 102, 120, the outer wall 102 and inner wall 120 also may move axially and radially with respect to the combustor dome 118. By decoupling the combustor dome 118 from the walls 102, 120 and allowing relative movement between the walls 102, 120 and the combustor dome 118, stress coupling may be alleviated between the outer and inner walls 102, 120 and the combustor dome 118. Moreover, any leakage between the uncoupled combustor dome 118 and outer and inner walls 102, 120 may be utilized as purge and/or film starter flow.

FIG. 3F provides a partial perspective view of a portion of an integral flow path assembly 101, having an outer wall 102 and inner wall 120 formed as a single piece component. As described with respect to FIG. 3D and shown in FIG. 3F, in some embodiments of the combustion gas flow path assembly 101, the outer liner 108, outer band 110, shroud 112, outer band 114, shroud 116, combustor dome 118, inner liner 122, and inner band 124 are integrally formed such that the outer liner 108, outer bands 110, 114, shrouds 112, 116, combustor dome 118, inner liner 122, and inner band 124 are a single unitary structure. FIG. 3F further illustrates that a plurality of openings 142 for receipt of fuel nozzle assemblies 90 and/or swirlers 92 may be defined in the forward end 88 of combustor 80 of the unitary flow path assembly 101. Further, it will be appreciated that FIG. 3F illustrates only a portion of the integral flow path assembly 101 and that, although its entire circumference is not illustrated in FIG. 3F, the flow path assembly 101 is a single, unitary piece circumferentially as well as axially. As such, the integral flow path assembly 101 defines a generally annular, i.e., generally ring-shaped, flow path between the outer wall 102 and inner wall 120.

Integrating various components of the outer and inner boundaries of the flow path assembly 101 as described above can reduce the number of separate pieces or components within engine 10, as well as reduce the weight, leakage, and complexity of the engine 10, compared to known gas turbine engines. For instance, known gas turbine engines employ seals or sealing mechanisms at the interfaces between separate pieces of the flow path assembly to attempt to minimize leakage of combustion gases from the flow path. By integrating the outer boundary, for example, as described with respect to unitary outer wall 102, split points or interfaces between the outer combustor liner and first turbine stage outer band, the first turbine stage outer band and the first turbine stage shroud, etc. can be eliminated, thereby eliminating leakage points as well as seals or sealing mechanisms required to prevent leakage. Similarly, by integrating components of the inner boundary, split points or interfaces between the integrated inner boundary components are eliminated, thereby eliminating leakage points and seals or sealing mechanisms required at the inner boundary. Accordingly, undesired leakage, as well as unnecessary weight and complexity, can be avoided by utilizing unitary components in the flow path assembly. Other advantages of unitary outer wall 102, unitary inner wall 120, and/or a unitary flow path assembly 101 will be appreciated by those of ordinary skill in the art.

As illustrated in FIGS. 3A through 3F, the outer wall 102 and the inner wall 120 define a generally annular flow path therebetween. That is, the unitary outer wall 102 circumferentially surrounds the inner wall 120; stated differently, the unitary outer wall 102 is a single piece extending 360° degrees about the inner wall 120, thereby defining a generally annular or ring-shaped flow path therebetween. As such, the combustor dome 118, which extends across the forward end 88 of the combustor 80, is a generally annular combustor dome 118. Further, the combustor dome 118 defines an opening 142 for receipt of a fuel nozzle assembly 90 positioned at forward end 88. The fuel nozzle assembly 90, e.g., provides combustion chamber 86 with a mixture of fuel and compressed air from the compressor section, which is combusted within the combustion chamber 86 to generate a flow of combustion gases through the flow path 100. The fuel nozzle assembly 90 may attach to the combustor dome 118 or may "float" relative to the combustor dome 118 and the flow path 100, i.e., the fuel nozzle assembly 90 may not be attached to the combustor dome 118. In the illustrated embodiments, the fuel nozzle assembly 90 includes a swirler 92, and in some embodiments, the swirler 92 may attach to the combustor dome 118, but alternatively, the swirler 92 may float relative to the combustor dome 118 and flow path 100. It will be appreciated that the fuel nozzle assembly 90 or swirler 92 may float relative to the combustor dome 118 and flow path 100 along both a radial direction R and an axial direction A or only along one or the other of the radial and axial directions R, A. Further, it will be understood that the combustor dome 118 may define a plurality of openings 142, each opening receiving a swirler 92 or other portion of fuel nozzle assembly 90.

As further illustrated in FIGS. 3A through 3F, the flow path assembly 101 generally defines a converging-diverging flow path 100. More particularly, the outer wall 102 and the inner wall 120 define a generally annular combustion chamber 86, which forms a forward portion of the flow path 100. Moving aft or downstream of combustion chamber 86, the outer wall 102 and inner wall 120 converge toward one another, generally in the region of first turbine stage 82. Continuing downstream of the first turbine stage 82, the outer wall 102 and inner wall 120 then diverge, generally in the region of second turbine stage 84. The outer wall 102 and inner wall 120 may continue to diverge downstream of the second turbine stage 84. In exemplary embodiments, e.g., as shown in FIG. 3A and referring only to the unitary outer wall 102, the first turbine stage nozzle outer band portion 110 and blade shroud portion 112 of the outer wall 102 converge toward the axial centerline 12. The second turbine stage nozzle outer band portion 114 and blade shroud portion 116 of the outer wall 102 diverge away from the axial centerline 12. As such, the outer boundary of flow path 100 formed by the unitary outer wall 102 defines a converging-diverging flow path 100.

Turning to FIG. 4, a cross-sectional view is provided of a portion of the flow path assembly 101 according to an exemplary embodiment of the present subject matter. As shown in the depicted embodiment, the flow path assembly 101 includes an inner wall 120 and a unitary outer wall 102. As described above, the unitary outer wall 102 includes a combustor portion 104 that extends through the combustion section 26 and a turbine portion 106 that extends through at least a first turbine stage 82 of the turbine section 28; in the embodiment of FIG. 4, the turbine portion extends through the second turbine stage 84. Further, the combustor portion 104 and the turbine portion 106 of the outer wall 102 are integrally formed as a single unitary structure and, thus, may be referred to as unitary outer wall 102, and the inner wall 120 and the unitary outer wall 102 define the combustor 80.

More particularly, in the illustrated embodiment, the combustor portion 104 of the unitary outer wall 102 comprises the outer liner 108 of the combustor 80, and the turbine portion 106 comprises the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B. The inner wall 120 also may include a unitary structure that may be referred to as unitary inner wall portion. For example, in FIG. 4, the inner wall 120 comprises a forward segment 120a and an aft segment 120b, and the forward segment 120a is a unitary structure that may be referred to as unitary inner wall portion 120a. The unitary inner wall portion 120a includes the inner liner 122 and a forward portion of the first turbine stage inner band 124, which are integrally formed as unitary inner wall portion 120a. The aft segment 120b comprises the remaining portion of the inner wall 120, i.e., the remainder of the first turbine stage inner band 124. In some embodiments, as previously described, the unitary outer wall 102 or unitary inner wall portion 120a also may include the combustor dome 118, or the unitary outer wall 102 and the unitary inner wall portion 120a each may include a portion of the combustor dome 118. In still other embodiments, the outer wall 102, combustor dome 118, and the forward segment 120a of inner wall 120 may be integrally formed as a single piece, unitary structure.

Referring still to the embodiment illustrated in FIG. 4, the flow path assembly 101 further includes a plurality of first turbine stage nozzle airfoils 126. Each of the plurality of nozzle airfoils 126 extends between pockets defined in the inner boundary structure and the outer boundary structure of flow path assembly 101. More particularly, each nozzle airfoil 126 has an inner end 126a radially opposite an outer end 126b. The unitary outer wall 102 defines a plurality of outer pockets 170, and each outer pocket 170 is configured for receipt of the outer end 126b of one of the plurality of first turbine stage nozzle airfoils 126. Similarly, the inner wall 120 defines a plurality of inner pockets 174. More specifically, as shown in FIG. 4, a portion of each inner pocket 174 is defined by the forward segment 120a of inner wall 120 and a remaining portion of each inner pocket 174 is defined by the aft segment 120b. Further, each inner pocket 174 is configured for receipt of the inner end 126a of one of the plurality of first turbine stage nozzle airfoils 126. Accordingly, a nozzle airfoil 126 extends from each inner pocket 174 to a respective outer pocket 170.

Keeping with FIG. 4, the plurality of outer pockets 170 are defined along an area 178 of an inner surface 103 of the unitary outer wall 102, and the unitary outer wall 102 is built up at the area 178 where the plurality of outer pockets 170 are defined. The built up area 178 may provide extra thickness in outer wall 102 such that the outer pockets 170 may be defined therein, without requiring the extra thickness throughout the entire unitary outer wall 102.

Moreover, the forward segment 120a of the inner wall 120 comprises a forward flange 182, and the aft segment 120b of the inner wall 120 comprises an aft flange 184. Each flange 182, 184 extends radially inward from the inner wall 120, i.e., toward the axial centerline 12. The forward flange 182 is positioned adjacent the aft flange 184 when the forward segment 120a and the aft segment 120b are assembled in the flow path assembly 101. Each flange 182, 184 defines at least one pin aperture 186 for receipt of a pin 188. As such, at least one pin 188 secures the forward flange 182 to the aft flange 184, e.g., to hold the forward and aft segments 120a, 120b of inner wall 120 in position with respect to one another.

It will be appreciated that the configuration illustrated in FIG. 4 is by way of example only. For instance, although FIG. 4 depicts only the first turbine stage nozzle portion 82N of the flow path assembly 101, the subject matter described with respect to the first turbine stage nozzle portion 82N applies equally to the second turbine stage nozzle portion 84N, and also may apply to any other nozzle portions of the turbine sections of the engine 10. That is, while only the first turbine stage nozzle airfoils 126 and the adjacent portions of outer wall 102 and inner wall 120 are shown and described with respect to FIG. 4, the second turbine stage nozzle airfoils 128 and the adjacent portions of outer wall 102 and inner wall 120 may be similarly configured. More particularly, the outer wall 102 may define a plurality of second outer pockets for the receipt of the outer ends of nozzle airfoils 128, and the second stage inner band 136 may comprise forward and aft segments that together define a plurality of second inner pockets for receipt of the inner ends of the nozzle airfoils 128. The outer wall 102 may be built up in the area in which the second outer pockets are defined, e.g., to provide sufficient thickness for the second outer pockets to be defined in the outer wall 102. Further, the forward and aft segments of the second stage inner band 136 may each include a flange, and the flanges of the forward and aft inner band segments may be bolted together, e.g., to attach the segments to one another. However, in other embodiments, the first turbine stage nozzle portion 82N may be configured as shown in FIG. 4 while the second turbine stage nozzle portion 84N, as well as nozzle portions of other turbine stages, may be configured differently from the depicted embodiment.

In other exemplary embodiments, the outer wall 102 may comprise forward and aft segments and the inner wall 120 may be a unitary inner wall 120. That is, some embodiments may utilize essentially an opposite configuration from the configuration illustrated in FIG. 4. More particularly, the unitary inner wall 120 may comprise the inner liner 122 of the combustor 80 and the inner band 124 of the first turbine stage nozzle portion 82N. Further, the outer wall 102 may comprise a forward segment and an aft segment. The forward segment may be a unitary structure that may be referred to as unitary outer wall portion. The unitary outer wall portion includes the outer liner 108 and a forward portion of the first turbine stage outer band 110, which are integrally formed as unitary outer wall portion. The aft segment comprises the remaining portion of the outer band 110 and may further include the first turbine stage shroud 112 and a forward portion of the second turbine stage outer band 114. A second aft segment comprises at least the remainder of the second turbine stage outer band 114 and also may comprise the second turbine stage shroud 116. In some embodiments, the forward segment of outer wall 102 or unitary inner wall 120 also may include the combustor dome 118, or the outer wall forward segment and unitary inner wall 120 each may include a portion of the combustor dome 118. In still other embodiments, the outer wall forward segment, combustor dome 118, and inner wall 120 may be integrally formed as a single piece, unitary structure.

Moreover, similar to the embodiment shown in FIG. 4, each of the plurality of nozzle airfoils 126, 128 may extend between pockets defined in the inner boundary structure and the outer boundary structure of flow path assembly 101. More specifically, the unitary inner wall 120 defines a plurality of inner pockets 174 and a plurality of second inner pockets. Each inner pocket 174 is configured for receipt of the inner end 126a of one of the plurality of first turbine stage nozzle airfoils 126, and each second inner pocket is configured for receipt of the inner end of one of the plurality of second turbine stage nozzle airfoils 128.

Similarly, the outer wall 102 defines a plurality of outer pockets 170. A portion of each outer pocket 170 is defined by the forward segment of outer wall 102 and a remaining portion of each outer pocket 170 is defined by the aft segment. A plurality of second outer pockets also may be defined in the outer wall 102, e.g., a portion of each second outer pocket may be defined by the forward portion of the second turbine stage outer band portion of the outer wall aft segment, and a remaining portion of each second outer pocket may be defined by the second aft segment, which includes the remainder of the second turbine stage outer band. Further, each outer pocket 170 is configured for receipt of the outer end 126*b* of one of the plurality of first turbine stage nozzle airfoils 126, and each second outer pocket is configured for receipt of the outer end of one of the plurality of second turbine stage nozzle airfoils 128. Accordingly, a first turbine stage nozzle airfoil 126 extends from each inner pocket 174 to a respective outer pocket 170, and a second turbine stage nozzle airfoil 128 extends from each second inner pocket to a respective second outer pocket.

Further, similar to the embodiment shown in FIG. 4, the plurality of inner pockets 174 may be defined along an area of an inner surface 121 of the unitary inner wall 120, and the unitary inner wall 120 may be built up at the area where the plurality of inner pockets 174 are defined. Likewise, the plurality of second inner pockets may be defined along an area of inner surface 121, and the unitary inner wall 120 may be built up at the area where the plurality of second inner pockets are defined. The built up areas near the inner pockets may provide extra thickness in inner wall 120 such that the inner pockets may be defined therein, without requiring the extra thickness throughout the entirety of inner wall 120.

Moreover, the forward and aft segments of the outer wall 102 may comprise flanges for securing the outer wall segments to one another. For example, the forward segment of the outer wall 102 may comprise a forward flange, the aft segment of the outer wall 102 may comprise a first aft flange and a second aft flange, and the second aft segment may comprise a third aft flange. Each flange may extend radially outward from the outer wall 102, i.e., away from the axial centerline 12. The forward flange may be positioned adjacent the first aft flange when the forward and aft segments are assembled in the flow path assembly 101, and the second aft flange may be positioned adjacent the third aft flange when the aft segment and the second aft segment are assembled in the flow path assembly 101. Each flange defines at least one pin aperture 186 for receipt of a pin 188. As such, at least one pin 188 secures the forward flange to the first aft flange, e.g., to hold the forward and aft segments of outer wall 102 in position with respect to one another. Similarly, at least one pin 188 secures the second aft flange to the third aft flange, e.g., to hold the aft segment and the second aft segment of outer wall 102 in position with respect to one another.

It will be understood that each pocket 170, 172, 174, 176 may have a shape substantially similar to an axial cross-sectional shape of the respective airfoil 126, 128 received within the pocket. That is, each outer pocket 170, 172 may generally be described as an airfoil-shaped depression in the outer wall 102, and each inner pocket 174, 176 may generally be described as an airfoil-shaped depression in the inner wall 120 and inner band 136. More specifically, the first outer pockets 170 and first inner pockets 174 may have a shape corresponding to the first turbine stage nozzle airfoils 126, the second outer pockets 172 and second inner pockets 176 may have a shape corresponding to the second turbine stage nozzle airfoils 128. However, the pockets 170, 172, 174, 176 may have any appropriate shape for receiving the nozzle airfoils 126, 128.

Utilizing an outer wall 102 or an inner wall 120 that comprises forward and aft segments may help simplify the assembly of the flow path assembly 101. For example, referring to the exemplary embodiment of FIG. 4, the outer wall 102 and the forward segment 120*a* of the inner wall 120 may be positioned in the assembly. Next, the plurality of first turbine stage nozzle airfoils 126 may be installed, e.g., by inserting the outer ends 126*b* of the airfoils 126 into the first outer pockets 170 and positioning the inner ends 126*a* within the portion of the first inner pockets 174 defined by the forward segment 120*a* of inner wall 120. Then, the aft segment 120*b* of the inner wall 120 may be slid into position, with the remainder of the first inner pockets 174 defined in the aft segment 120*b* enclosing the inner ends 126*a* of the first turbine stage nozzle airfoils 126 in the first inner pockets 174. The first stage rotor 134 may then be installed, followed by the forward segment 136*a* of the second turbine stage inner band 136. Next, the second turbine stage nozzle airfoils 128 may be installed, e.g., by inserting the outer ends 128*b* of the airfoils 128 into the second outer pockets 172 and positioning the inner ends 128*a* within the portion of the second inner pockets 176 defined by the forward segment 136*a* of inner band 136. Then, the aft segment 136*b* of the inner band 136 may be slid into position, with the remainder of the second inner pockets 176 defined in the aft segment 136*b* enclosing the inner ends 128*a* of the second turbine stage nozzle airfoils 128 in the second inner pockets 176. The second stage rotor 138 may be installed to complete the assembly of the flow path assembly 101, as well as the combustion section 26 and HP turbine section 28 of the engine 10.

Turning now to FIGS. 5 and 6, another exemplary embodiment of the flow path assembly 101 is provided. The depicted embodiment utilizes a bayonet type joint to secure the nozzle airfoils 126, 128, which are integral with the outer wall 102, to the inner wall 120 and inner band 136. That is, referring particularly to FIG. 5, the first turbine stage nozzle airfoils 126 are integrated with the outer wall 102 to form a unitary structure with the outer boundary of the flow path assembly 101. Thus, the outer wall 102 depicted in FIG. 5 is similar to the embodiment of FIG. 3E, although the airfoils 126 of FIG. 5 are not integrated with the inner wall 120, and the inner wall 120 and combustor dome 118 may, but need not, be integral with the unitary outer wall 102.

Accordingly, as shown in FIG. 5, the inner end 126*a* of the nozzle airfoils 126 is positioned against the inner surface 121 of the inner wall 120, and each inner end 126*a* includes a bayonet that is received in a bayonet slot defined in the inner wall 120 as described in greater detail below. Further, the inner wall 120 includes a built up portion or area 119 immediately upstream or forward of the nozzle airfoils 126, such that the built up area 119 helps shield the interface between the nozzle airfoils 126 and the inner wall 120 from the hot combustion gases. It also will be appreciated that the built up area 119 of inner wall 120 may function similar to fillets that may be defined on nozzle airfoils 126 in other embodiments of the airfoils. The built up area 119 may be an area of built up CMC material that forms the inner wall 120.

Keeping with FIG. 5, the inner end 126*a* of each nozzle airfoil 126 includes a projection or bayonet 190, which is received in a bayonet slot 192 defined in the inner wall 120. More particularly, referring to FIG. 6, the inner wall 120 defines a plurality of bayonet slots 192 such that each bayonet 190 is received in a bayonet slot 192 of the inner wall 120. Each slot 192 generally has an L-shape, i.e., each bayonet slot 192 has a first leg 192*a* and a second leg 192*b* that extends generally perpendicular to the first leg 192*a*. The first and second legs 192*a*, 192*b* are joined together to form a continuous pathway, i.e., bayonet slot 192. Thus, when a bayonet 190 of a nozzle airfoil 126 is received within a bayonet slot 192, the inner wall 120 may be slid such that the bayonet 190 moves along the first leg 192a and then the inner wall 120 may be rotated such that the bayonet 190 then moves along the second leg 192b until the bayonet 190 is seated within an end 192c of the bayonet slot 192. Thus, the nozzle airfoils 126 are secured in the inner wall 120 via bayonet joints, which prevent axial movement of the nozzle airfoil bayonets 190 within the inner wall bayonet slots 192 to secure the airfoils 126 in the inner wall 120.

Further, the bayonet slots 192 are defined such that the slots 192 are oriented to take any tangential and axial loads from the nozzle airfoils 126. That is, the bayonet slots 192 are oriented such that a tangential and/or axial load on a nozzle airfoil 126 loads the airfoil into the inner wall 120 surrounding the bayonet 190 rather than causing the bayonet 190 to move along or within the slot 192. Therefore, the bayonet slots 192 are defined in a manner that prevents the nozzle airfoils 126 from being dislodged from or moving from the slot ends 192c when the airfoils are subject to aerodynamic loads.

As also illustrated in FIGS. 5 and 6, a first support member 194 and a second support member 196 are positioned radially inward of the inner wall 120, i.e., closer to the axial centerline 12 of engine 10, to support the inner wall. The first support member 194 defines a groove 198 for receipt of a projection 200 of the inner wall 120. The inner wall projection 200 provides an area for bayonet slots 192 to be defined in the inner wall 120 for the receipt of airfoil bayonets 190. The first support member groove 198 fits against the projection 200 to support the inner wall 120 at the projection 200. The first support member 194 further includes a housing 202 at a forward side 204 of the first support member. The housing 202 is configured for receipt of a seal 206, which preferably is generally ring shaped to extend circumferentially against the inner wall 120. For example, the seal 206 may be a piston ring seal or other suitable seal. The seal 206 helps prevent air leakage at the forward or upstream end of the inner wall 120.

The second support member 196 is positioned axially aft of the first support member 194. The second support member 196 includes a plurality of tabs 208. As shown in FIGS. 5 and 6, the inner wall 120 defines a plurality of recesses 210 along an aft surface 123 of the inner wall. Each tab 208 of the second support member 196 is received in a recess 210 of the inner wall 120 to position or fit the second support member 196 against the aft surface 123 of inner wall 120 such that the second support member 196 covers the plurality of bayonet slots 192 defined in the inner wall 120. As such, the second support member 196 helps prevent fluid leakage from or into the bayonet slots 192.

As further depicted in FIG. 5, the first support member defines a flange 212 and the second support member defines a flange 214. Each flange 212, 214 defines an aperture 216, and a bolt 218 is received through the aperture 216 of the first support member 194 and the aperture 216 of the second support member 196 to secure the first support member to the second support member. Other ways of securing the first and second support members 194, 196 to one another also may be used, and in suitable embodiments, the first and second support members 194, 196 may be one integral, single piece component or may be divided into more than two components.

It will be appreciated that, although FIGS. 5 and 6 depict only the first turbine stage nozzle portion 82N of the flow path assembly 101, the subject matter described with respect to the first turbine stage nozzle portion 82N applies equally to the second turbine stage nozzle portion 84N, and also may apply to any other nozzle portions of the turbine sections of the engine 10. That is, while only the first turbine stage nozzle airfoils 126 are shown and described with respect to FIGS. 5 and 6, the second turbine stage nozzle airfoils 128 may be similarly configured, and the second stage inner band 136 may be configured similarly to the first stage inner band portion of the inner wall 120. Further, first and second support members similar to those depicted in FIGS. 5 and 6 also may be provided in the second turbine stage. However, in other embodiments, the first turbine stage nozzle portion 82N may be configured as shown in FIGS. 5 and 6 while the second turbine stage nozzle portion 84N, as well as nozzle portions of other turbine stages, may be configured differently from the depicted embodiment.

As previously stated, the outer wall 102, inner wall 120, and combustor dome 118, and in some embodiments, first and second turbine stage nozzle airfoils 126, 128, may comprise a CMC material. More particularly, in exemplary embodiments, the combustor portion 104 and the turbine portion 106 of flow path assembly 101 are integrally formed from a CMC material such that the resulting unitary structure is a CMC component. For example, where the combustor portion 104 includes the outer liner 108 of the combustor 80 and the turbine portion 106 includes the outer band 110 of the first turbine stage nozzle portion 82N, the shroud 112 of the first turbine stage blade portion 82B, the outer band 114 of the second turbine stage nozzle portion 84N, and the shroud 116 of the second turbine stage blade portion 84B, the outer liner 108, outer bands 110, 114, and shrouds 114, 116 may be integrally formed from a CMC material to produce a unitary CMC outer wall 102. As described above, in other embodiments, additional CMC components, such as the nozzle airfoils 126, 128, may be integrally formed with the outer liner 108, outer bands 110, 114, and shrouds 114, 116 to construct a unitary CMC outer wall 102. Similarly, the inner wall 120 may be formed from a CMC material. For instance, where the inner wall 120 comprises separate components, e.g., inner liner 122, inner bands 124, 136, and blade platforms 132, each component of the inner wall 120 may be formed from a CMC material. In embodiments in which two or more components are integrated to form a unitary inner wall 120, the components may be integrally formed from a CMC material to construct a unitary CMC inner wall 120.

Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a unitary structure, such as the outer wall 102 depicted in FIG. 3A, as a unitary CMC component. More specifically, a plurality of plies of a CMC material may be used to form each unitary structure. The plurality of plies may be interspersed with one another to integrate the various portions forming the unitary structure. As an example, the unitary outer wall 102 of FIG. 3A may be made from a plurality of outer liner plies, a plurality of first turbine stage outer band plies, a plurality of first turbine stage shroud plies, a plurality of second turbine stage outer band plies, and a plurality of second turbine stage shroud plies. Where the outer liner plies meet the first turbine stage outer band plies, ends of the outer liner plies may be alternated with ends of the outer band plies to integrate the plies for forming the outer liner portion with the plies for forming the first turbine stage outer band portion of the unitary outer wall 102. That is, any joints between the plies forming unitary outer wall 102 may be formed by alternating plies on one side of the joint with plies on the other side of the joint. As such, the plies for forming unitary outer wall 102 may be interspersed to integrate the plies and, thereby, each portion of the unitary outer wall 102. Of course, the CMC plies may be laid up in other ways as well to form the unitary structure. In addition, laying up the plurality of CMC plies may include defining features of the unitary structure or other component (e.g., inner liner 122 when not integrated with inner band 124 to from a unitary inner wall 120 or separate combustor dome 118) such as openings 142 in combustor forward end 88.

After the plurality of CMC plies are laid up to define a unitary CMC component preform, the preform is cured to produce a single piece, unitary CMC component, which is then fired and subjected to densification, e.g., silicon melt-infiltration, to form a final unitary CMC structure. Continuing with the above outer wall 102 example, the outer wall preform may be processed in an autoclave to produce a green state unitary outer wall 102. Then, the green state unitary outer wall 102 may be placed in a furnace to burn out excess binders or the like and then placed in a furnace with a piece or slab of silicon and fired to melt infiltrate the unitary outer wall 102 with at least silicon. More particularly, for unitary outer wall 102 formed from CMC plies of prepreg tapes that are produced as described above, heating (i.e., firing) the green state component in a vacuum or inert atmosphere decomposes the binders, removes the solvents, and converts the precursor to the desired ceramic matrix material. The decomposition of the binders results in a porous CMC body; the body may undergo densification, e.g., melt infiltration (MI), to fill the porosity. In the foregoing example where the green state unitary outer wall 102 is fired with silicon, the outer wall 102 undergoes silicon melt-infiltration. However, densification may be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC outer wall 102. In some embodiments, the final unitary structure may be finish machined, e.g., to bring the structure within tolerance or to define openings 142 in forward end 88, and/or an environmental barrier coating (EBC) may be applied to the unitary structure, e.g., to protect the unitary structure from the hot combustion gases 66. It will be appreciated that other methods or processes of forming CMC components, such as unitary CMC outer wall 102, unitary CMC inner wall 120, or the like may be used as well.

Additionally or alternatively, other processes for producing unitary components may be used to form unitary outer wall 102 and/or unitary inner wall 120, and the unitary structure(s) may be formed from other materials. In some embodiments, an additive manufacturing process may be used to form unitary outer wall 102 and/or unitary inner wall 120. For example, an additive process such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering or other known process may be used to produce a unitary outer wall 102 and/or a unitary inner wall 120. Generally, an additive process fabricates components using three-dimensional information, for example, a three-dimensional computer model, of the component. The three-dimensional information is converted into a plurality of slices, each slice defining a cross section of the component for a predetermined height of the slice. The component is then "built-up" slice by slice, or layer by layer, until finished. Superalloy metallic materials or other suitable materials may be used in an additive process to form unitary outer wall 102 and/or a unitary inner wall 120. In other embodiments, a unitary outer wall 102 and/or unitary inner wall 120 may be formed using a forging or casting process. Other suitable processes or methods may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A flow path assembly for a gas turbine engine, the flow path assembly comprising:
    an inner wall;
    an outer wall; and
    a plurality of nozzle airfoils, each nozzle airfoil of the plurality of nozzle airfoils having an inner end radially opposite an outer end,
    wherein the inner wall and the outer wall define a combustor of a combustion section of the gas turbine engine,
    wherein the outer wall defines a plurality of outer pockets, each outer pocket of the plurality of outer pockets configured for receipt of the outer end of one of the plurality of nozzle airfoils,
    wherein the inner wall includes a forward segment and an aft segment, the inner wall defining a plurality of inner pockets such that a portion of each inner pocket of the plurality of inner pockets is defined by the forward segment and a remaining portion of each inner pocket of the plurality of inner pockets is defined by the aft segment, each inner pocket of the plurality of inner pockets configured for receipt of the inner end of one of the plurality of nozzle airfoils such that a nozzle airfoil of the plurality of nozzle airfoils extends from each inner pocket of the plurality of inner pockets to a respective outer pocket of the plurality of outer pockets,
    wherein the forward segment of the inner comprises a forward flange and the aft segment of the inner wall comprises an aft flange,
    wherein the forward flange is positioned adjacent the aft flange when the forward segment and the aft segment are assembled n the flow path assembly, and
    wherein at least one pin secures the forward flange to the aft flange.

2. The flow path assembly of claim 1, wherein the plurality of outer pockets are defined along an area of an inner surface of the outer wall, and wherein the outer wall is built up at the area where the plurality of outer pockets are defined.

3. The flow path assembly of claim 1, wherein the forward segment of the inner wall is a unitary inner wall segment, and wherein the unitary inner wall segment comprises an inner liner and a portion of a first turbine stage inner band that are integrally formed as a single unitary structure.

4. The flow path assembly of claim 3, wherein the aft segment of the inner wall comprises a remaining portion of the first turbine stage inner band.

5. The flow path assembly of claim 1, wherein the outer wall includes a combustor portion extending through the combustion section of the gas turbine engine and a turbine portion extending through at least a first turbine stage of a turbine section of the gas turbine engine, wherein the combustor portion and the turbine portion are integrally formed as a single unitary structure from a ceramic matric composite (CMC) material such that the outer wall is a unitary CMC component, and wherein the inner wall is formed from a CMG material such that the inner wall is a CMG component.

* * * * *

UNITED STATES PATENT AND TRADEMARK OFFICE
CERTIFICATE OF CORRECTION

PATENT NO. : 11,286,799 B2
APPLICATION NO. : 16/377398
DATED : March 29, 2022
INVENTOR(S) : Jason David Shapiro, Donald Brett Desander and Edward Charles Vickers It is certified that error appears in the above-identified patent and that said Letters Patent is hereby corrected as shown below:

In the Claims

Claim 1 should read:
1. A flow path assembly for a gas turbine engine, the flow path assembly comprising:
an inner wall;
an outer wall; and
a plurality of nozzle airfoils, each nozzle airfoil of the plurality of nozzle airfoils having an inner end radially opposite an outer end,
wherein the inner wall and the outer wall define a combustor of a combustion section of the gas turbine engine,
wherein the outer wall defines a plurality of outer pockets, each outer pocket of the plurality of outer pockets configured for receipt of the outer end of one of the plurality of nozzle airfoils,
wherein the inner wall includes a forward segment and an aft segment, the inner wall defining a plurality of inner pockets such that a portion of each inner pocket of the plurality of inner pockets is defined by the forward segment and a remaining portion of each inner pocket of the plurality of inner pockets is defined by the aft segment, each inner pocket of the plurality of inner pockets configured for receipt of the inner end of one of the plurality of nozzle airfoils such that a nozzle airfoil of the plurality of nozzle airfoils extends from each inner pocket of the plurality of inner pockets to a respective outer pocket of the plurality of outer pockets,
wherein the forward segment of the inner wall comprises a forward flange and the aft segment of the inner wall comprises an aft flange,
wherein the forward flange is positioned adjacent the aft flange when the forward segment and the aft segment are assembled in the flow path assembly, and
wherein at least one pin secures the forward flange to the aft flange.

Claim 5 should read:
5. The flow path assembly of claim 1, wherein the outer wall includes a combustor portion extending through the combustion section of the gas turbine engine and a turbine portion extending through at least a first turbine stage of a turbine section of the gas turbine engine, wherein the combustor portion Signed and Sealed this
Twenty-fifth Day of October, 2022

*Katherine Kelly Vidal*

Katherine Kelly Vidal
*Director of the United States Patent and Trademark Office* and the turbine portion are integrally formed as a single unitary structure from a ceramic matrix composite (CMC) material such that the outer wall is a unitary CMC component, and wherein the inner wall is formed from a CMC material such that the inner wall is a CMC component.